United States Patent
Lamb et al.

[11] Patent Number: 5,713,241
[45] Date of Patent: Feb. 3, 1998

[54] HYDRAULIC SYSTEM

[75] Inventors: Margaret M. Lamb, Leicester, England; John E. Myslik, Holly Springs, N.C.

[73] Assignee: Caterpillar Inc., Peoria, Ill.

[21] Appl. No.: 566,362

[22] Filed: Dec. 1, 1995

[51] Int. Cl.$^6$ ................................................. G01F 23/02
[52] U.S. Cl. .................................. 73/330; 73/323
[58] Field of Search ......................... 73/323, 324, 325, 73/326, 327, 328, 329, 330, 331, 332, 333, 334; 116/276

[56] References Cited

U.S. PATENT DOCUMENTS

| | | | |
|---|---|---|---|
| 1,288,377 | 12/1918 | Bryan | 73/330 |
| 1,307,892 | 6/1919 | Lank | 73/332 |
| 1,444,016 | 2/1923 | Warthen et al. | 73/330 |
| 1,880,847 | 10/1932 | Daly . | |
| 2,611,271 | 9/1952 | Van Ham | 73/331 |
| 2,993,376 | 7/1961 | Kinderman | 73/290 |
| 3,125,882 | 3/1964 | Johnson et al. | 73/331 |
| 3,435,681 | 4/1969 | Stanley | 73/327 |
| 3,533,287 | 10/1970 | Kruschik | 73/331 |
| 3,625,390 | 12/1971 | Meginnis | 73/334 |
| 3,783,690 | 1/1974 | Bridegum et al. | 73/328 |
| 4,787,832 | 11/1988 | Fukasawa et al. | 417/500 |
| 5,383,338 | 1/1995 | Bowsky et al. | 62/125 |

*Primary Examiner*—William A. Cuchlinski, Jr.
*Assistant Examiner*—Willie Morris Worth
*Attorney, Agent, or Firm*—Claude F. White

[57] ABSTRACT

A hydraulic system for a work machine includes a fluid supply tank, a visual sight gage assembly, and an air expansion tank. A plurality of tubes and lines connect the supply tank to the sight gage assembly and the air expansion tank to the sight gage assembly. An enclosure wall partially encloses the supply tank and is positioned at an angle greater than 90° with a horizontal plane. The sight gage assembly is connected to the wall enclosure and is positioned at the same angle. The construction of the sight gage assembly prevents trapping of air in the assembly when the supply tank is filled with fluid. Thus false readings of the fluid level in the supply tank is avoided.

10 Claims, 2 Drawing Sheets

Fig. - 1 -
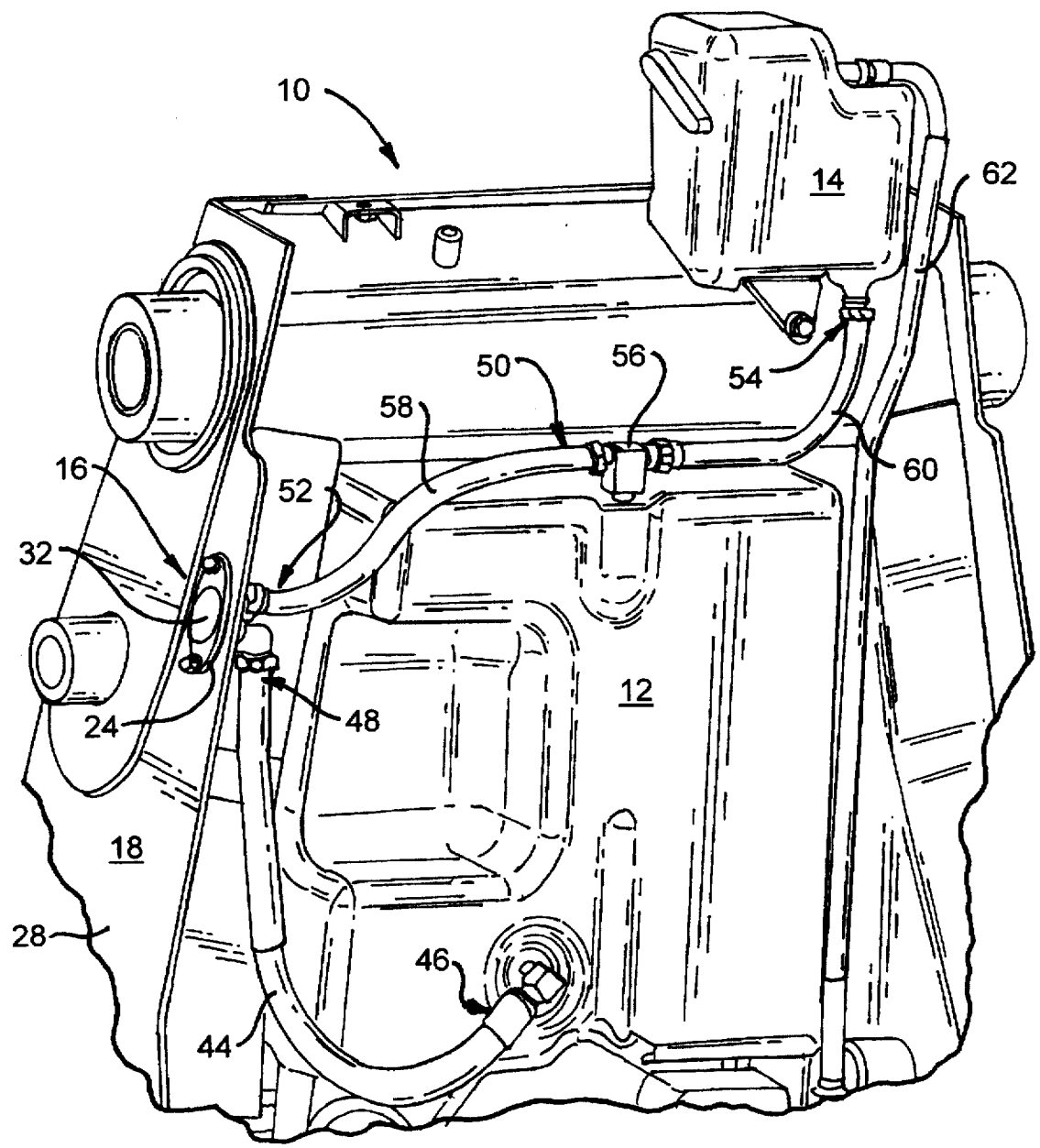

Fig. - 2 -
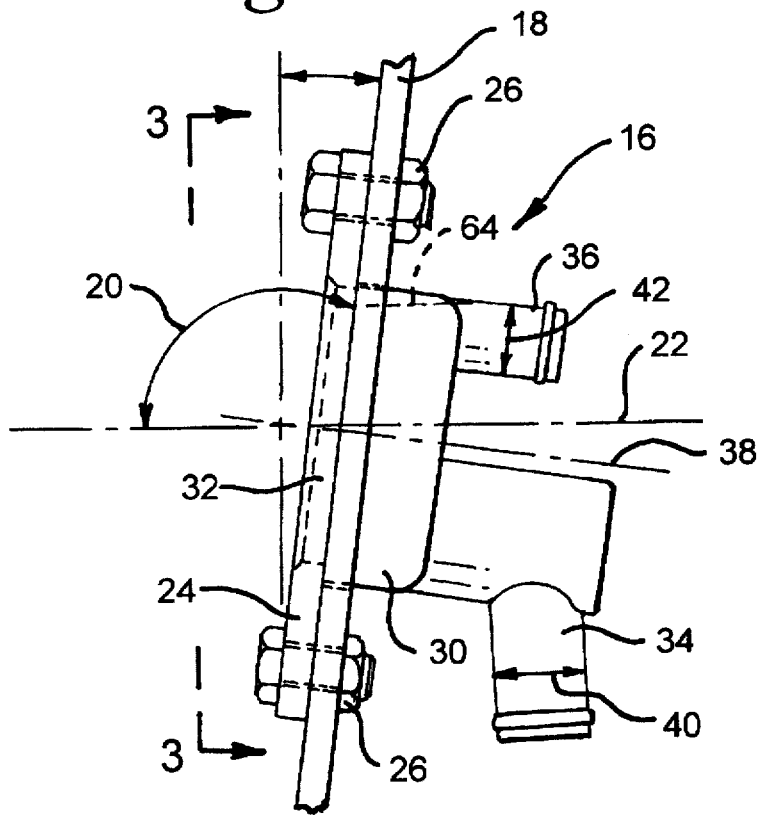
Fig. - 3 -
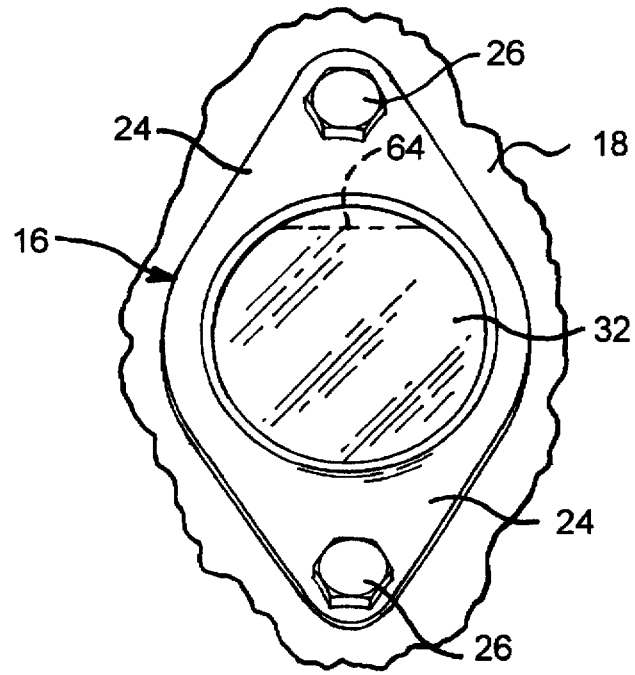

HYDRAULIC SYSTEM

TECHNICAL FIELD

This invention relates generally to a hydraulic system for a work machine and more particularly to a visual fluid sight gage used to view the level of the hydraulic fluid in the system.

BACKGROUND ART

Earthmoving and construction machines utilize a variety of implements and tools to perform a multitude of work tasks. Many of these work implements and tools are powered by a plurality of hydraulic motors and cylinders. A hydraulic reservoir, or tank, stores the volume of hydraulic fluid needed to operate the work implements. One or more fluid pumps draw hydraulic fluid from the tank, supply the fluid to the work implements, and return the fluid to the tank.

Some method of determining the amount of hydraulic fluid in the tank is generally provided in the hydraulic systems. These methods generally include a dipstick device or some type of visual sight gage. Most of the visual sight gages are positioned directly in the hydraulic tank or in a line adjacent to the tank. This makes it difficult to view the gage since the tanks are generally located within an enclosure or are positioned in a remote area of the machine.

The present invention is directed to overcoming one or more of the problems as set forth above.

DISCLOSURE OF THE INVENTION

In one aspect of the present invention, a hydraulic system for a work machine includes a tank for storing a supply of hydraulic fluid, an air expansion tank, an enclosure wall for partially enclosing the tank, and a visual fluid sight gage associated with the enclosure wall. The hydraulic system further includes a first tube connecting the tank to the sight gage and a second tube connecting the sight gage to the air expansion tank. The enclosure wall and the sight gage are positioned at an angle greater than 90° from a horizontal plane.

BRIEF DESCRIPTION OF THE DRAWINGS

FIG. 1 is a diagrammatic perspective view of a hydraulic system of the present invention;

FIG. 2 is an enlarged diagrammatic side elevational view of a sight gage of the present invention; and FIG. 3 is an enlarged diagrammatic front elevational view taken generally along the lines 3—3 of FIG. 2.

BEST MODE FOR CARRYING OUT THE INVENTION

With reference to the drawings, a hydraulic system 10 for a work machine (not shown) includes a tank for storing a supply of hydraulic fluid for the work machine, an air expansion tank 14 positioned above the supply tank 12, and a visual fluid sight gage assembly 16. The supply tank 12 is partially enclosed by an enclosure wall 18 which is positioned at an angle 20 which is greater than 90° from a horizontal plane 22. Preferably, the angle 20 is about 96°. The sight gage assembly 16 includes a mounting plate 24 and fastening means 26 for connecting the mounting plate 24 and sight gage assembly 16 to the outer surface 28 of the enclosure wall 18. Because the sight gage assembly 16 is mounted directly to the enclosure wall 18, it is also positioned at substantially the same angle 20 as the enclosure wall 18.

The visual fluid sight gage assembly 16 is used to visually determine the level of fluid within the supply tank 12. The sight gage assembly 16 further includes a hollow body portion 30, a clear tempered sight glass 32, a first fluid inlet port 34, and a second outlet port 36. The body portion 30 has a horizontal centerline 38, and is connected to the mounting plate 24 with the sight glass 32 positioned between the mounting plate 24 and the body portion 30. The first inlet port 34 is connected to the body portion 30 at a position below the centerline 38 and the second outlet port 36 is connected to the body portion 30 at a position above the centerline 38. The first inlet port 34 has a first diameter 40 and the second outlet port 36 has a second diameter 42, with the first diameter 40 being larger than the second diameter 42. The first diameter 40 is about 35 percent larger than the second diameter 42.

A first supply tube 44 has a first end portion 46 connected to the supply tank 12 and a second end portion 48 connected to the first inlet port 34 of the sight gage assembly 16. A second tube 50 has a first end portion 52 connected to the outlet port 36 of the sight gage assembly 16 and a second end portion 54 connected to the air expansion tank 14. A fluid recovery mechanism 56, in the form of a fitting 56, is connected to the supply tank 12 and recovers any hydraulic fluid which is inadvertently transported past the sight gage assembly 16 and into the second tube 50. The second tube 50 transfers air from the supply tank 12, past the sight gage assembly 16 and into the air expansion tank 14. The second tube 50 includes a first section 58 connecting the fluid recovery mechanism 56 to the sight gage assembly 16, and a second section 60 connecting the fluid recovery mechanism 56 to the air expansion tank 14. An air outlet tube 62 vents the air from the air expansion tank 14. The level of fluid in the supply tank 12 is easily determined by viewing the level 64 of the fluid in the sight glass 32.

INDUSTRIAL APPLICABILITY

With reference to the drawings and the previous detailed description, the subject hydraulic system 10 and fluid sight gage assembly 16 are particularly useful with a work machine having a plurality of hydraulically powered work implements and tools. The hydraulic supply tank 12 serves as a storage and supply tank for the various implements and tools.

When the supply tank 12 is being initially filled with hydraulic fluid, the fluid also flows up the supply tube 44 and into the sight gage assembly 16. Any air that is in the supply tank 12 is forced out of the tank 12, into tube 44, across the sight gage assembly 16, through the second tube 50, and into the air expansion tank 14. The air is then vented through the air outlet tube 62. Any fluid that inadvertently flows into the second tube 44 is recovered by the fitting 56 and flows back into the supply tank 12. While the tank 12 is being filled, the level of fluid in the tank 12 is easily discernable by viewing the sight glass 32. The sight gage assembly 16 is conveniently positioned in the enclosure wall 18. The level of fluid in the supply tank 12 can be easily determined at any time by viewing the fluid level 64 in the sight glass 32.

The construction of the sight gage assembly 16 prevents trapping of air within the assembly 16 during filling or replenishing fluid to the tank 12. Since the sight gage assembly 16 is positioned at an angle 20 with the wall enclosure 18, the inlet port 34 is positioned below the centerline 38 and the air outlet port 36 is positioned above the centerline 38. The inlet port 34 is also larger in diameter than the outlet port 36. Therefore, as the fluid level 64 rises in the sight gage assembly 16, any air above the fluid level has an outlet path into the outlet port 36. The level of fluid 64 in the sight gage assembly 16 is directly proportionate to the level of, and amount of, fluid in the supply tank 12.

We claim:

1. A hydraulic system for a work machine, comprising:

a supply tank for storing a supply of hydraulic fluid for the work machine;

an air expansion tank positioned above said supply tank;

an enclosure wall for partially enclosing said reservoir tank, said enclosure wall being positioned at an angle greater than 90° from a horizontal plane;

a visual fluid sight gage assembly connected to said enclosure wall and adapted to be positioned at substantially the same angle as said enclosure wall;

a first tube having a first end portion connected to said supply tank and a second end portion connected to said sight gage assembly; and a second tube having a first end portion connected to said sight gage assembly and a second end portion connected to said air expansion tank.

2. A hydraulic system, as set forth in claim 1, including a fluid recovery mechanism in fluid engagement with said supply tank, and said second tube having a first section connecting said fluid recovery mechanism to said sight gage assembly and a second section connecting said fluid recovery mechanism to said air expansion tank.

3. A hydraulic system, as set forth in claim 1, wherein said sight gage assembly has a horizontal centerline, and includes a first inlet port and a second outlet port, said first inlet port being positioned below said centerline and said second outlet port being positioned above said centerline.

4. A hydraulic system, as set forth in claim 3, wherein said first inlet port has a first diameter and said second outlet port has a second diameter, said first diameter being larger than said second diameter.

5. A hydraulic system, as set forth in claim 4, wherein said first diameter is about 35 percent larger than said second diameter.

6. A hydraulic system, as set forth in claim 1, wherein the angle of said sight gage assembly is about 96° from a horizontal plane.

7. A hydraulic system, as set forth in claim 1, wherein said sight gage assembly includes a tempered clear glass sight portion.

8. A visual fluid sight gage assembly for visually determining the level of fluid within a fluid supply tank, said tank being positioned within an enclosure having a wall with said wall being positioned at an angle greater than 90° from a horizontal plane, said sight gage assembly comprising:

a mounting plate;

a hollow body portion connected to said mounting plate; said body portion having a horizontal centerline;

a clear tempered sight glass positioned between said mounting plate and said body portion;

a first fluid inlet port connected to said body portion at a position below said centerline;

a second outlet port connected to said body portion at a position above said centerline; and means to mount said mounting plate to said enclosure wall with said sight gage assembly positioned at substantially the same angle as set enclosure wall.

9. A sight gage, as set forth in claim 8, wherein said first fluid inlet port has a first diameter and said second outlet port has a second diameter, said first diameter being larger than said second diameter.

10. A sight gage, as set forth in claim 8, wherein the angle of said sight gage is about 96° from a horizontal plane.

* * * * *